United States Patent
Pfisterer et al.

(10) Patent No.: US 6,866,105 B2
(45) Date of Patent: Mar. 15, 2005

(54) ELECTRICAL, FAN-COOLED TOOL

(75) Inventors: Hans-Jürgen Pfisterer, Karlsruhe (DE); Holger Cecchin, Germering (DE); Walter Wissmach, Munich (DE); Christoph Kink, Stadtbergen (DE); Ferdinand Kristen, Gilching (DE); Rudolf Bauer, Landsberg (DE); Erwin Manschitz, Germering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/660,431

(22) Filed: Sep. 11, 2003

(65) Prior Publication Data

US 2004/0124721 A1 Jul. 1, 2004

(30) Foreign Application Priority Data

Sep. 12, 2002 (DE) .......................................... 102 42 414

(51) Int. Cl.[7] .............................................. B25D 17/20
(52) U.S. Cl. ...................... 173/117; 173/217; 173/122
(58) Field of Search ................................ 173/117, 122, 173/217; 310/50, 58

(56) References Cited

U.S. PATENT DOCUMENTS

| | | | | |
|---|---|---|---|---|
| 4,314,170 A | * | 2/1982 | Sahrbacker | 310/68 R |
| 4,766,963 A | * | 8/1988 | Hartwig et al. | 173/109 |
| 5,052,497 A | * | 10/1991 | Houben et al. | 173/109 |
| 5,331,239 A | * | 7/1994 | Kwun et al. | 310/68 R |
| 5,763,969 A | * | 6/1998 | Metheny et al. | 310/62 |
| 6,123,158 A | * | 9/2000 | Steffen | 173/217 |
| 6,127,751 A | * | 10/2000 | Kristen et al. | 310/50 |
| 6,325,157 B1 | * | 12/2001 | Arakawa et al. | 173/201 |
| 6,543,549 B1 | * | 4/2003 | Riedl et al. | 173/216 |
| 6,758,288 B2 | * | 7/2004 | Richter et al. | 173/217 |

* cited by examiner

Primary Examiner—Scott A. Smith
Assistant Examiner—Thanh Truong
(74) Attorney, Agent, or Firm—Sidley Austin Brown & Wood, LLP

(57) ABSTRACT

An electrical tool includes a housing having inlet (7) and outlet (8) openings, a brushless electric motor (2) and an inverted rectifier (3) both arranged in the housing (9) between inlet (7) and outlet (8) openings in an air stream (5) of an air volume (6), and a link condensator (10) located in the housing (9) in the air stream (5), with the inverted rectifier (3) being arranged, in the air flow direction, downstream of the link condensator (10) and upstream of the electric motor (2).

7 Claims, 1 Drawing Sheet

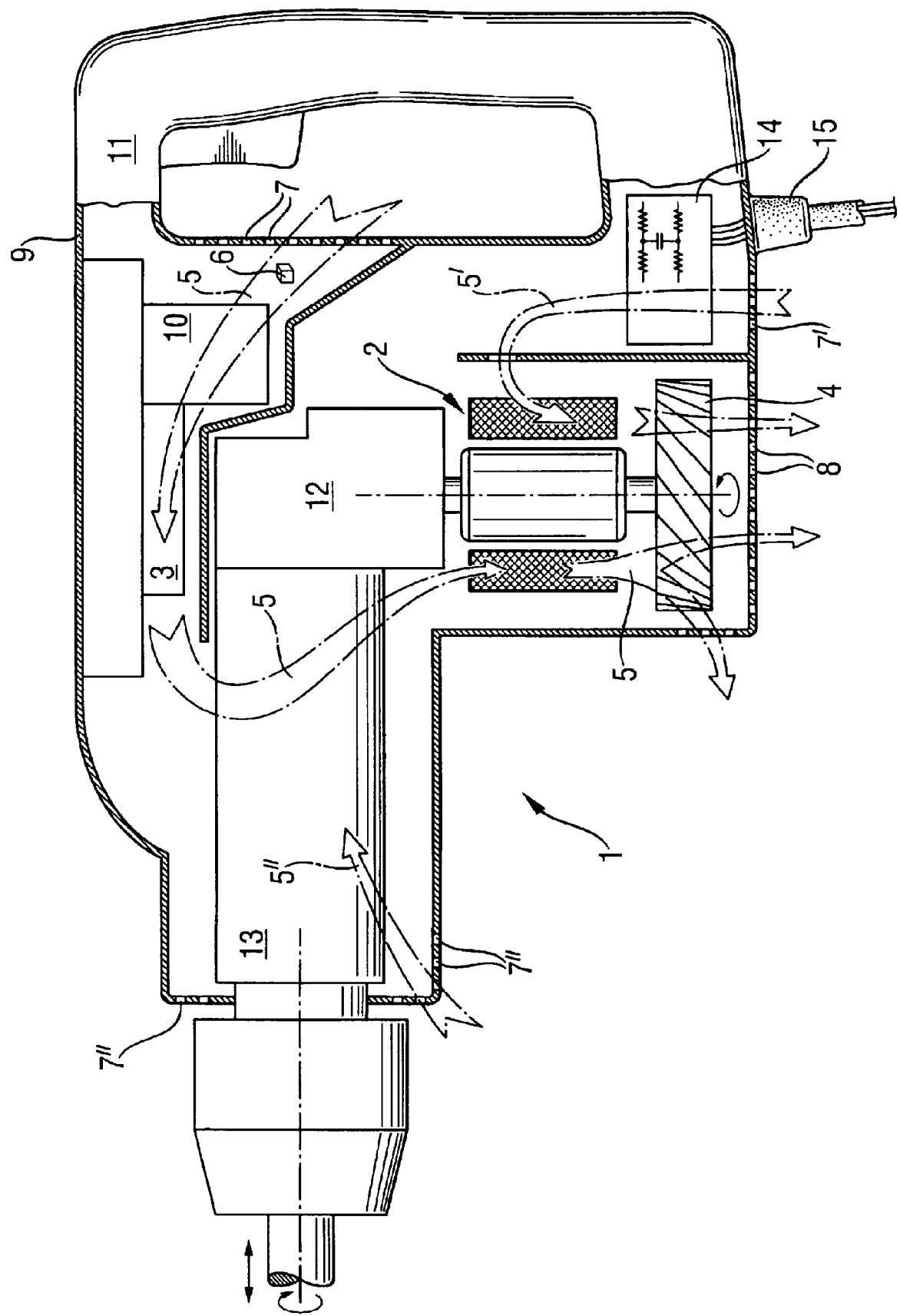

ELECTRICAL, FAN-COOLED TOOL

BACKGROUND OF THE INVENTION

1. Field of the Invention

The present invention relates to an electrical, fan-cooled, in particular, hand-held tool.

2. Description of the Prior Art

In powerful electrical tools, in particular, in electrical hand-held tools instead of universal motors, brushless electrical motors are used and which include an inverted rectifier and a constant voltage d.c. link with a link condensator for an intermediate power storage. The losses associated with the storage lead to heating of the link condensator which has, in comparison with the inverted rectifier and the electrical motor, a lower limiting temperature.

U.S. Pat. No. 6,127,751 discloses a hand-held power tool in which both the electrical motor and the motor electronics are arranged parallel to each other in an air stream of a fan located in the air flow direction downstream of the electric motor and the motor electronics.

German Publication DE-100 21 356 discloses cooled brushless electric motor and inverted rectifier which, according to U.S. Pat. No. 4,766,963, are arranged between inlet and outlet openings of a housing parallel to each other within an air stream produced by a ventilator. The components, which have different limiting temperatures are cooled in parallel by the same air stream. As a result, the cooling potential of the air stream is not used optimally. In this tool, there is no link condensator.

U.S. Pat. No. 5,331,239 discloses a compact motor-inverted rectifier unit with a brushless electric motor, inverted rectifier, constant voltage d.c. link with a link condensator, and a fan the air stream of which firstly cools the link condensator and then is separated in two streams for cooling the electric motor and the inverted rectifier. However, a compact motor-inverted rectifier unit is not suitable for electrical tool, in particular for electrical hand-held tool with separated free chambers in the tool housing.

Accordingly, an object of the present invention is an electrical tool with a fan and a link condensator and in which the air stream is used optimally.

SUMMARY OF THE INVENTION

This and other objects of the present invention, which will become apparent hereinafter, are achieved by providing an electrical tool including a housing having at least one inlet opening and at least one outlet opening, a brushless electric motor and in inverted rectifier which are arranged in the housing between the at least one inlet opening and the at least one outlet opening in an air stream of an air volume, and a link condensator located in the housing in the air stream, the inverted rectifier being arranged, in the air flow direction, downstream of the link condensator and upstream of the electric motor.

With the series arrangement in the air stream one after another, in the flow direction, of the link condensator, inverted rectifier, and the electric motor, the link condensator with a lower limited temperature is cooled first with a fresh, aspirated, coolest air volume, and the electric motor, which has the highest limiting temperature, is cooled with a warmest air volume which absorbed the heat of both the link condensator and the inverted rectifier.

Advantageously, the fan is arranged in the air stream, in the flow direction, downstream of the electric motor which insures that the fan can be structurally connected with the rotor of the elector motor.

Advantageously, the fan is arranged in front of the outlet opening (s), which insures an immediate removal of a warm air outside of the tool.

Advantageously, the inlet opening(s) is/are arranged in the region of the handle, preferably on the handle inner side. This prevents suction of a dust-containing air.

Advantageously, the transformation mechanics, the gear unit and/or the percussion mechanism, are arranged, in the air flow direction, between the inverted rectifier and the electric motor. As a result of such an arrangement, the heat from the transformation mechanics is also removed by a warm air volume.

Advantageously, in the inventive electrical tool, there are provided parallel air streams in which other tool components are arranged. The additional air streams permit to cool other tool components, without increasing the path of the main air stream.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

Single FIGURE of the drawings shows a side, cross-sectional view of an electrical, fan-cooled, hand-held tool according to the present invention

DETAILED DESCRIPTION OF THE PREFERRED EMBODIMENT

The present invention will be described with reference to a hammer drill which is shown in the drawing. The hammer drill 1 includes a brushless electrical motor 2 and an inverted rectifier 3 which are arranged in the housing 9 between the at least one inlet openings 7 and outlet openings 8 in an air stream 5 of a volume 6 that is generated by a fan 4. The inverted rectifier 3 is arranged in the air stream 5 in the flow direction downstream of a link condensator 10 and upstream of the electric motor 2. The fan 4 is arranged in the flow direction downstream of the electric motor 2 and in front of outlet openings 8. The inlet openings 7 are provided in the inner region of a handle 11. In the air stream 5 in the flow direction, between the inverted rectifier 3 and the electric motor 2, a gear unit 12 and a percussion mechanism 13 are arranged. A network connection unit 14 is arranged in a parallel air stream 5' between the inlet openings 7' and the outlet openings 8. The network connection unit 14 includes a connector for connection with a network cable 15 and a radio interference suppression filter. A further air stream 5", which enters into the housing 9 through further inlet openings 7" provided in the front side of the housing 9, serves for cooling the percussion mechanism 13.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An electrical tool, compromising a housing (9) having at least one inlet opening (7) and at least one outlet opening (8); a brushless electric motor (2) and an inverted rectifier (3) which are arranged in the housing (9) between the at least one inlet opening (7) and the at least one outlet opening (8) in an air stream (5) of an air volume (6); and a link condensator (10) located in the housing (9) in the air stream (5), the inverted rectifier (3) being arranged, in the air flow direction, downstream of the link condensator (10) and upstream of the electric motor (2).

2. An electrical tool according to claim 1, further comprising a fan (4) arranged in the air stream (5) downstream, in the air flow direction, of the electric motor (2).

3. An electrical tool according to claim 1, wherein the fan (4) is arranged in front of the at least one outlet opening (8).

4. An electrical tool according to claim 1, wherein the at least one inlet opening (7) for the air volume (6) is arranged in a region of a tool handle (11).

5. An electrical tool according to claim 4, wherein the at least one inlet opening (7) is arranged on an inner side of the tool handle (11).

6. An electrical tool according to claim 1, further comprising transformation mechanics (12, 13) arranged in the air stream (5) between the inverted rectifier (3) and the electric motor (2).

7. An electrical tool according to claim 1, further comprising means (7', 7") for producing parallel air streams (5', 5") for cooling other components of the tool.

* * * * *